Nov. 14, 1950     L. C. CASSELLE     2,529,678
METHOD OF AND APPARATUS FOR PRODUCING
FLATTENED GLASS TUBING
Filed Aug. 4, 1949     3 Sheets-Sheet 1

Inventor
Leonard Charles Casselle
By
Pennie, Edmonds, Morton and Barrows
Attorneys

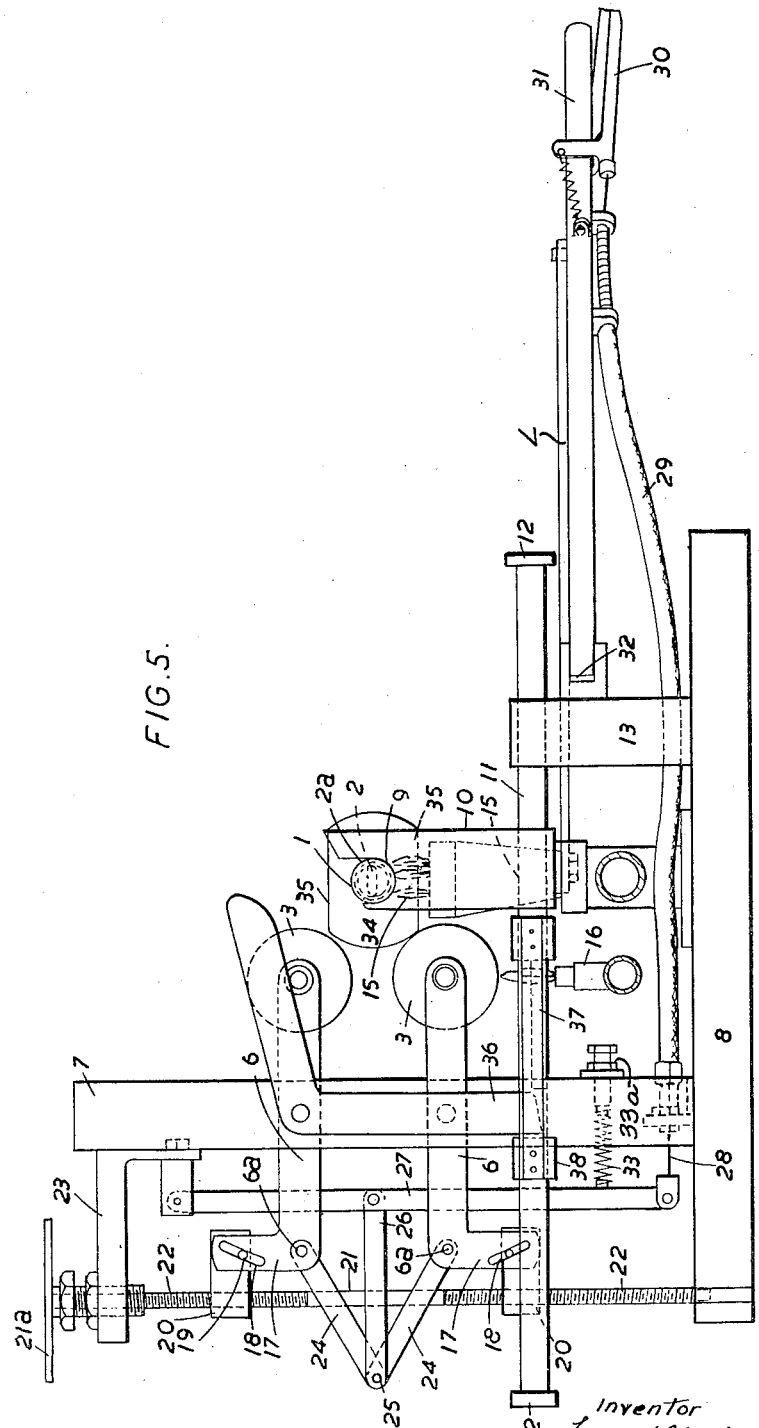

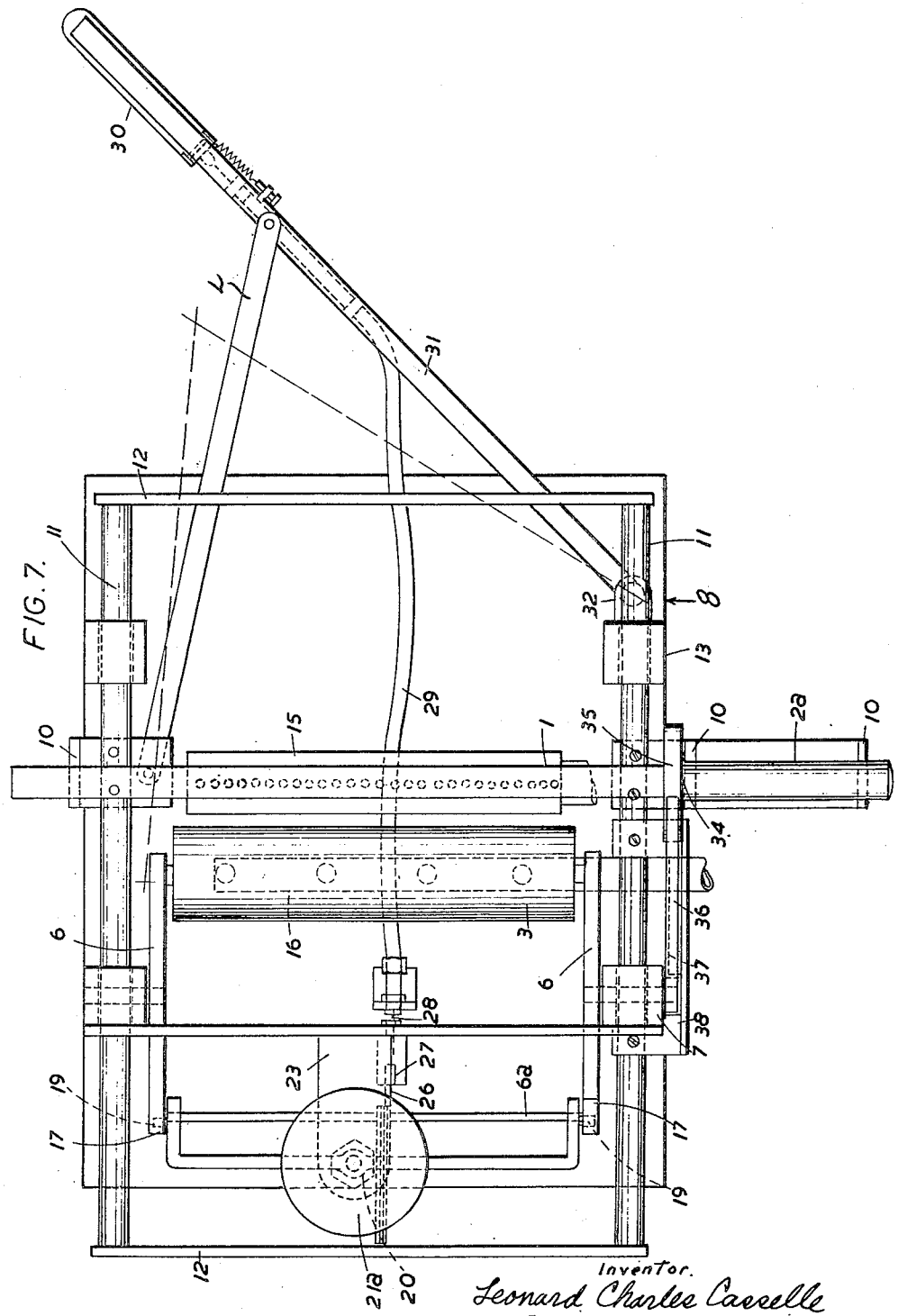

Patented Nov. 14, 1950

2,529,678

UNITED STATES PATENT OFFICE 2,529,678

METHOD OF AND APPARATUS FOR PRODUCING FLATTENED GLASS TUBING

Leonard C. Casselle, Thame, England

Application August 4, 1949, Serial No. 108,475
In Great Britain August 26, 1947

5 Claims. (Cl. 49—7)

1

The subject of the present invention is a method of an apparatus for producing flattened glass tubing from round glass tubing.

In accordance with the method of the present invention a former or core in the shape of a flat bar with rounded edges is inserted in the tubing which may be softened by heat in advance or with the former or core in position and the tube is pushed between a pair of rollers set to the required distance apart with the axis of the tubing parallel to the axes of the rollers and drawn back through the rollers. In its forward movement one curved surface joining the flattened surfaces is formed and in the reverse movement the opposite surface is formed.

The rollers may be heated to prevent cooling of the glass tubing during the rolling operations.

The former or core should be of highly polished metal to prevent sticking of the glass thereto.

Figure 6:
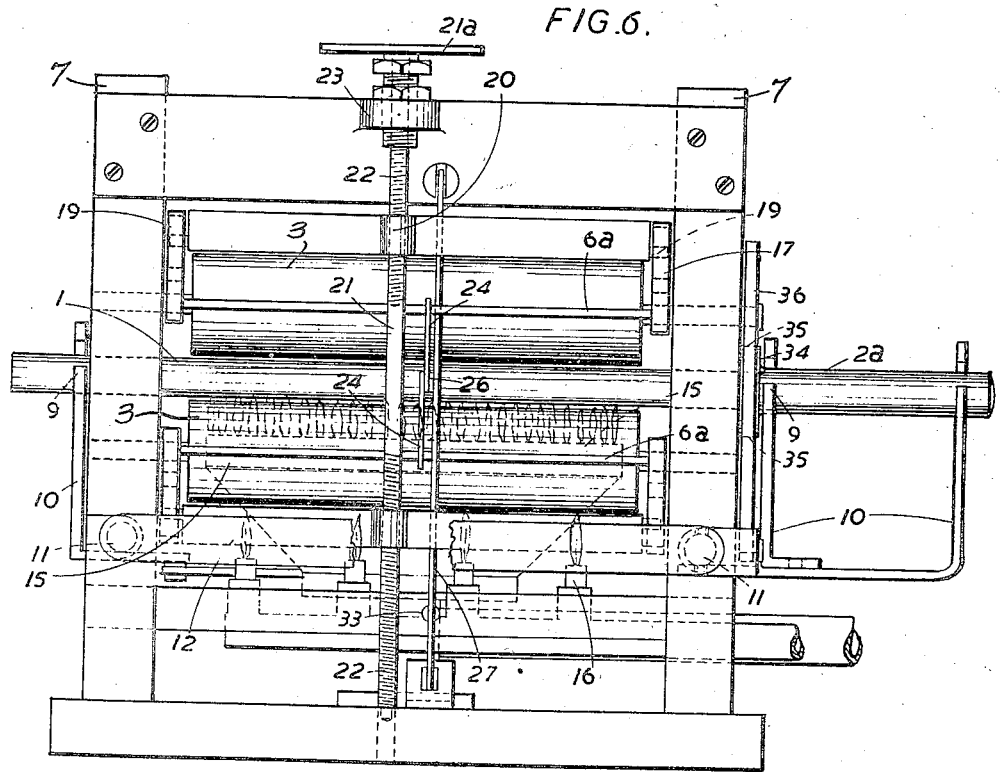

The invention is illustrated in the accompanying drawings in which Figs. 1 to 4 are diagrams illustrative of the steps in the method of the present invention while Figs. 5 to 7 illustrate a manually operable form of apparatus for carrying the method into effect, Fig. 5 being a side elevation, Fig. 6 an end view and Fig. 7 a plan.

Figure 1:
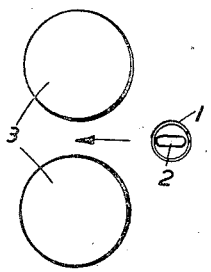
Figure 2:
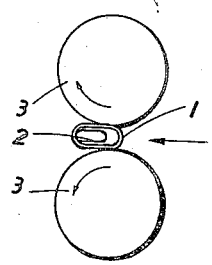
Figure 3:
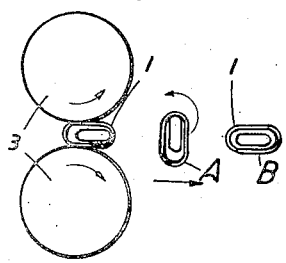
Figure 4:
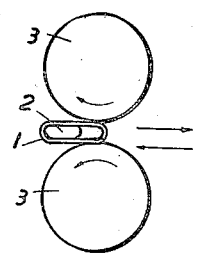

As will be understood from Figs. 1 to 4, in which 1 indicates the round glass tube to be flattened, 2 the former or core in the form of a flat bar and 3 a pair of forming rollers, in the method of the present invention the glass tube 1, supported on the core or former 2 and after being heated to render it plastic, is passed between the rollers 3 which have been brought by suitable mechanism to the correct distance apart as indicated in Fig. 2. In passing forward through the rollers the one curved surface joining the surfaces being flattened is formed around the forward edge of the core or former 2. The tube is then passed back between the rollers as indicated in Fig. 3 when the opposite curved surface is formed around the core or former 2. The tube may be rotated as indicated diagrammatically at A in Fig. 3 before and/or after passage through the rollers and reheated if necessary at B and passed back and forth repeatedly through the rollers as indicated in Fig. 4 to complete the flattening of the tube.

In the manually operable construction illustrated in Figs. 5 and 7 each roller 3 is carried at the ends of a pair of rocker arms 6 pivotally mounted on spaced upright members 7 of a machine frame designated generally by 8, each pair of arms 6 being connected by cross bars 6a. The glass tube 1 to be flattened with the former or

2 core 2 within it and its handle 2a projecting is supported parallel to the axes of the rollers in seatings 9 in saddle members 10 mounted on a slidable carriage. The slidable carriage is formed by rods 11 and cross bars 12, the rods being guided in bores in the upright members 7 and in uprights 13 upstanding from the base of the machine frame. 15 indicates a gas burner extending transversely of the frame for heating the glass tube while 16 indicates a gas burner for heating the rollers 3.

In order to adjust the initial setting of the rollers 3 to approximately the initial diameter of the glass tube to be flattened each pair of rocker arms 6 is provided at the ends remote from the rollers with similarly cranked portions 17. These cranked portions are provided with arcuate slots 18 engaged by pins 19 on the ends of a cross bar the central portion of which is arranged as a nut forming member 20. Through the nut-forming members extends a screw threaded spindle 21 having right and left hand threaded portions 22 and supported for rotation in the machine frame in a bearing bracket 23. A hand wheel 21a serves for rotation of the spindle 21, with consequent adjustment of the setting of the rollers. An index pointer (not shown) may be provided in conjunction with the hand wheel by which to determine the setting. By moving the nut forming members 20 further apart by rotation of the spindle 21 in one direction the rockers 6 are moved about their pivots on the uprights 7 and the gap between the rollers reduced. By rotation of the spindle in the other direction the gap between the rollers is increased.

The ends of the sets of rocker arms 6 remote from the rollers 3 are connected by links 24, coupled at a point 25 to a link 26 which is pivotally mounted on a lever arm 27 secured at its upper end to the machine frame and connected at its lower end to the wire 28 of a sheathed cable 29 which is attached at its remote end to a hand grip 30 mounted on an operating lever 31. The operating lever 31 is pivoted to the stationary upright 13 at 32 and is connected to the carriage by link L to move the carriage back and forwards. A spring 33 the tension of which is adjustable by means of a nut 33a serves to permit the required tension to be applied between the rollers. On the sheathed cable being operated by means of the hand grip 30 the ends of the rockers 6 remote from the rollers 3 are moved apart whereby the rollers 3 are brought together to compress the glass tube.

On the handle 2a of the core or former 2 is mounted a positioning plate 34 formed with two flat sides 35. In the operative position of the positioning plate in the machine it abuts against the sides of one of the uprights 7 as indicated in Fig. 7. In order to prevent any rotation of the former 2 during its passage with the glass tube through the rollers there is pivoted at one side of the said upright 7 a double armed lever 36 the lower end of which is adapted to be engaged by a cam 37 on the carriage which cam 37 in the forward movement of the carriage pushes forward the lower arm of lever 36 and thus presses the upper arm of the lever arm down on a flat surface 35 of the positioning plate 34. In front of the cam 37 on the carriage is mounted a stop 38 adapted on the return movement of the carriage to engage the lower arm of the lever 36 and raise the upper arm from the positioning plate 34 so that the former 2 and the tube 1 can be rotated freely.

In operation of the apparatus, the glass tube 1 with its former 2 is placed in position in the seatings 9 in the saddle members 10 of the carriage. It is heated to plasticity by means of the burner 15, being rotated by the handle 2a if necessary to ensure uniform heating of the glass. The carriage is then pushed forward by means of the lever 31 to cause the glass tube to pass between the rollers 3 the hand grip 30 having been pressed to ensure pressure of the rollers on the glass. In the forward movement of the carriage the lever 36 is moved by the cam 37 to bring the arm of the lever 36 into contact with the positioning plate 34 on the former so that the former cannot rotate during its passage through the rollers. On the return movement of the carriage after the tube has again passed through the rollers the stop 38 on the carriage tilts the lever 36 thus releasing the former and permitting it to be rotated by the handle 2a with the glass tube.

I claim:
1. A method of producing flattened glass tubing from round glass tubing consisting in passing the tube after softening of the glass and with a former or core in the form of a flat bar in position in the tube to and fro between rollers with the axis of the tube parallel with the axis of the rollers.

2. Apparatus for producing flattened glass tubing from round glass tubing including a framework on which a pair of parallel rollers is carried by rocker arms, a carriage slidable in said framework towards and from said rollers and a support on said carriage for supporting the glass tube and former with the axis of the tube parallel with the axes of said rollers.

3. Apparatus as claimed in claim 2 in which the distance between the rollers is adjustable by means of a screw threaded spindle engaging nut-forming members connected with the rocker arms.

4. Apparatus as claimed in claim 3 in which the rocker arms are movable independently of the initial setting to alter the gap between the rollers by means of links and levers operable by a cable.

5. Apparatus as claimed in claim 2 in which the former is provided with a positioning plate adapted to be restrained from rotation while the tube is passing between the rollers by means of a lever arm operated by a cam on the carriage.

L. C. CASSELLE.

REFERENCES CITED

The following references are of record in the file of this patent:

UNITED STATES PATENTS

| Number | Name | Date |
| --- | --- | --- |
| 2,172,899 | Barnard | Sept. 12, 1939 |
| 2,392,104 | Smith | Jan. 1, 1946 |